United States Patent
Sugimori et al.

(10) Patent No.: US 12,263,581 B2
(45) Date of Patent: Apr. 1, 2025

(54) ROBOT

(71) Applicant: KABUSHIKI KAISHA YASKAWA DENKI, Kitakyushu (JP)

(72) Inventors: Kanji Sugimori, Kitakyushu (JP); Yuto Tanaka, Kitakyushu (JP); Nobuhiko Mihara, Kitakyushu (JP); Hidenori Matsuura, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 0 days.

(21) Appl. No.: 18/451,827

(22) Filed: Aug. 17, 2023

(65) Prior Publication Data
US 2024/0075639 A1    Mar. 7, 2024

(30) Foreign Application Priority Data
Sep. 7, 2022  (JP) ................. 2022-142315

(51) Int. Cl.
*B25J 18/00*    (2006.01)

(52) U.S. Cl.
CPC ..................... *B25J 18/00* (2013.01)

(58) Field of Classification Search
CPC ........ B25J 18/00; B25J 17/02; B25J 17/0275; B25J 17/0283; B25J 17/0233
See application file for complete search history.

(56) References Cited

U.S. PATENT DOCUMENTS

| | | | |
|---|---|---|---|
| 11,745,364 B2 * | 9/2023 | Oikawa | B25J 17/025 74/490.01 |
| 2012/0198955 A1 * | 8/2012 | Hayashi | B25J 9/046 74/490.05 |
| 2014/0047940 A1 * | 2/2014 | Yamamoto | B25J 9/0009 74/490.05 |
| 2018/0326574 A1 * | 11/2018 | Cao | B25J 9/042 |

FOREIGN PATENT DOCUMENTS

| | | | | |
|---|---|---|---|---|
| CN | 206913180 U | * | 1/2018 | ............. B25J 18/00 |
| DE | 102013013679 A1 | * | 2/2014 | ............. B25J 17/00 |
| JP | 5225658 B2 | | 5/2009 | |
| JP | 2013-91159 | | 5/2013 | |
| JP | 5576911 B2 | | 2/2014 | |
| JP | 2018183843 A | * | 11/2018 | ............. B23K 9/133 |
| WO | WO2020031289 A1 | * | 2/2020 | ............. B25J 18/00 |

* cited by examiner

*Primary Examiner* — Zakaria Elahmadi
(74) *Attorney, Agent, or Firm* — MORI & WARD, LLP

(57) ABSTRACT

A robot includes a base, a pivot base, an upper arm, and a lower arm. The base is fixed to an installation surface. The pivot base has a pivot base proximal end which is connected to the base such that the pivot base is rotatable around a first axis along a vertical direction. The lower arm includes a first extending portion, a second extending portion, and a connecting portion. The connecting portion has a hollow structure and connects the first extending portion and the second extending portion such that the first arm proximal end faces the second arm proximal end and such that the first arm distal end faces the second arm distal end. The connecting portion includes a reinforcing portion in the hollow struc- (Continued)

ture. The reinforcing portion includes ribs which connect opposed inner walls of the connecting portion and which cross each other.

9 Claims, 7 Drawing Sheets

ROBOT

CROSS-REFERENCE TO RELATED APPLICATIONS

The present application claims priority under 35 U. S. C. § 119 to Japanese Patent Application No. 2022-142315, filed Sep. 7, 2022. The contents of this application are incorporated herein by reference in their entirety.

BACKGROUND OF THE INVENTION

Field of the Invention

The disclosed embodiments relate to a robot.

Discussion of the Background

In the related art, a robot that operates by driving each of a plurality of joint units is known. An end effector suitable for use such as welding or gripping is attached to a distal end of such a robot, and various operations such as processing or movement of a workpiece are performed.

Further, there has been proposed a robot including an arm in which a plate-like main structure portion and a plate-like auxiliary structure portion having a plate thickness smaller than that of the main structure portion are opposed to each other with a gap therebetween. Here, the main structure portion and the auxiliary structure portion are connected to each other by a connecting portion that extends to connect the main structure portion and the auxiliary structure portion (for example, see Japanese Patent Application Laid-Open No. 2013-091159).

SUMMARY OF THE INVENTION

According to one aspect of the present invention, a robot includes a base, a pivot base, an upper arm, and a lower arm. The base is fixed to an installation surface. The pivot base has a pivot base proximal end and a pivot base distal end opposite to the pivot base proximal end which is connected to the base such that the pivot base is rotatable around a first axis along a vertical direction. The lower arm includes a first extending portion, a second extending portion, and a connecting portion. The first extending portion has a first arm proximal end and a first arm distal end opposite to the first arm proximal end. The second extending portion has a second arm proximal end and a second arm distal end opposite to the second arm proximal end. The connecting portion has a hollow structure and connects the first extending portion and the second extending portion between the first arm proximal end and the first arm distal end and between the second arm proximal end and the second arm distal end such that the first arm proximal end faces the second arm proximal end and such that the first arm distal end faces the second arm distal end. The connecting portion includes a reinforcing portion in the hollow structure. The reinforcing portion includes ribs which connect opposed inner walls of the connecting portion and which cross each other. The pivot base distal end is provided between the first arm proximal end and the second arm proximal end to be connected to the first arm proximal end and the second arm proximal end such that the lower arm is rotatable around a second axis perpendicular to the first axis. The upper arm is provided between the first arm distal end and the second arm distal end to be connected to the first arm distal end and the second arm distal end such that the upper arm is rotatable around a third axis parallel to the second axis.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

DESCRIPTION OF THE EMBODIMENTS

Hereinafter, embodiments of a robot disclosed in the present application will be described in detail with reference to the accompanying drawings. The present invention is not limited to the embodiments described below.

In the embodiments described below, expressions such as "perpendicular", "orthogonal", and "vertical" are used, but it is not necessary to strictly satisfy these states. That is, the above-described expressions allow deviations in manufacturing accuracy, installation accuracy, processing accuracy, detection accuracy, and the like.

Figure 1:
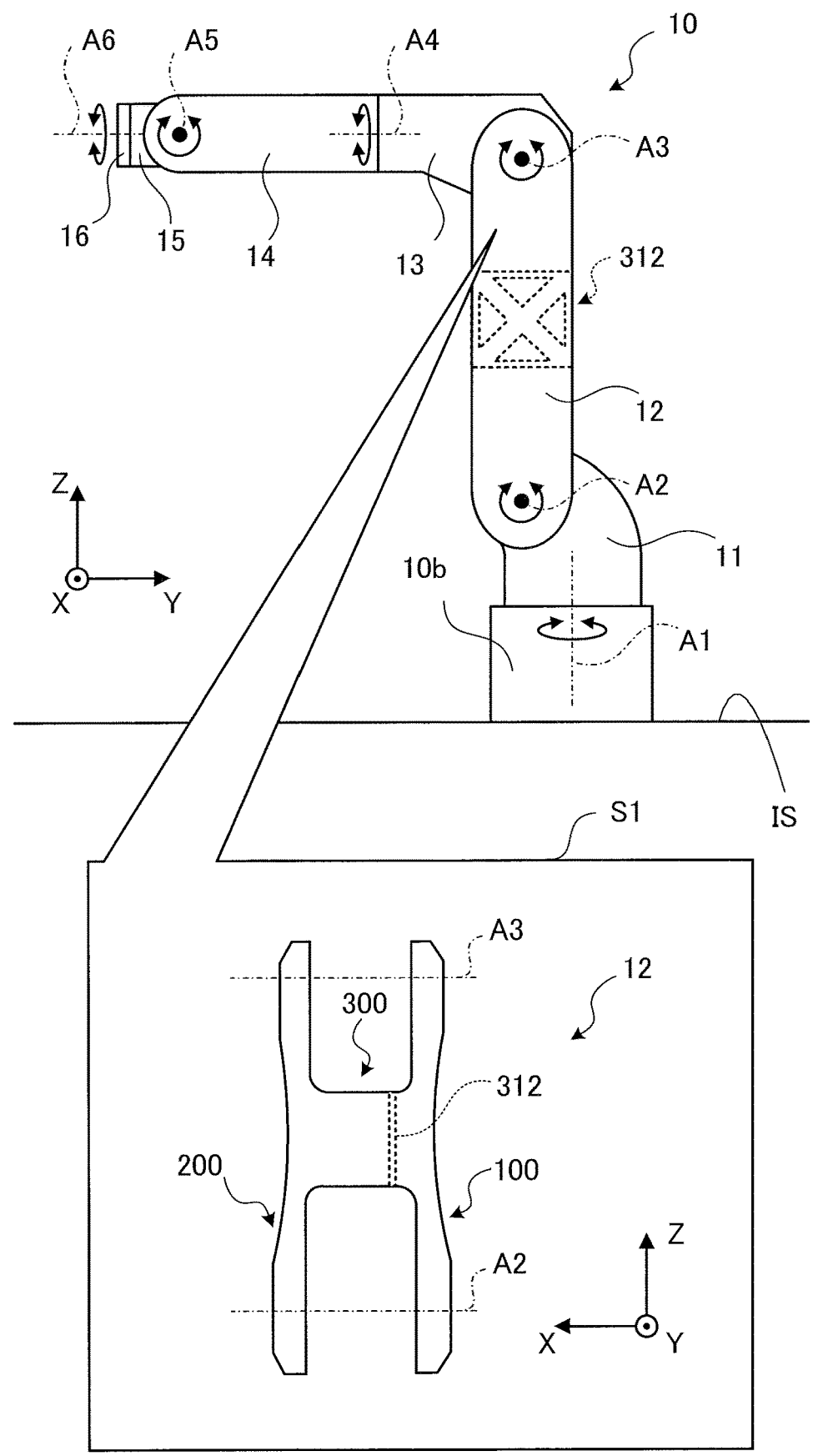
FIG. 1 is a side view of a robot according to an embodiment.

First, a robot 10 according to an embodiment will be described with reference to FIG. 1. FIG. 1 is a side view of a robot 10 according to an embodiment. In FIG. 1, a three dimensional orthogonal coordinate system including a Z-axis with a vertically upward direction as a positive direction is shown in order to make the description easy to understand. Such an orthogonal coordinate system may be shown in other drawings used in the following description. Note that "orthogonal" refers to being "perpendicular" and "crossing" each other.

As shown in FIG. 1, the robot 10 includes a base 10b, a first arm 11, a second arm 12, a third arm 13, a fourth arm 14, a fifth arm 15, and a sixth arm 16. In the following description, the first arm 11 is referred to as a pivot base 11, the second arm 12 is referred to as a lower arm 12, and the third arm 13 is referred to as an upper arm 13.

Here, FIG. 1 illustrates the robot 10 in a posture in which the lower arm 12 is turned in the vertical direction and the upper arm 13 is turned in the horizontal direction. In the following description, in the posture of the robot 10 shown in FIG. 1, the Y-axis positive direction is referred to as the back surface of the robot 10, and the Y-axis negative direction is referred to as the front surface of the robot 10.

The base 10b is fixed to the installation surface IS. A proximal end (an example of "a pivot base proximal end") of the pivot base 11 is supported on an upper surface of the base 10b, and the pivot base 11 turns around a first axis A1 along a vertical direction. Here, the term "pivot" refers to an operation of changing an angle between adjacent arms. The term "revolution" refers to an operation of rotating the arms to twist relative to each other without changing the angle formed by the adjacent arms. Note that "pivot" refers to an operation of swinging the arm around the rotation axis, and "revolution" refers to an operation of rotating the arm around the rotation axis along the extending direction of the arm. In the present embodiment, "pivot" and "revolution" are used separately as described above. However, depending on the shape of the arm of the robot and the position and the direction of the joint axis, there is a mode that can be referred to as "pivot" or "revolution", and thus the operation of the rotary joint of the robot may be referred to as "revolution" as a whole.

A distal end and a proximal end of the lower arm 12 are both formed in a forked shape, the proximal end is supported so as to sandwich the distal end (an example of "a pivot base distal end") of the pivot base 11, and the lower arm 12 turns around a second axis A2 perpendicular to the first axis A1. A proximal end of the upper arm 13 is supported so as to be sandwiched by a distal end of the lower arm 12, and the upper arm 13 turns around a third axis A3 parallel to the second axis A2.

The proximal end of the fourth arm 14 is supported by the distal end of the upper arm 13, and the fourth arm 14 rotates about a fourth axis A4 perpendicular to the third axis A3. The proximal end of the fifth arm 15 is supported by the distal end of the fourth arm 14, and the fifth arm 15 turns around a fifth axis A5 orthogonal to the fourth axis A4. The proximal end of the sixth arm 16 is supported by the distal end of the fifth arm 15, and the sixth arm 16 rotates about a sixth axis A6 orthogonal to the fifth axis A5. Various end effectors can be attached to and detached from the distal end of the sixth arm 16.

Here, the configuration of the lower arm 12 will be described in more detail with reference to the enlarged view S1 shown in FIG. 1. The enlarged view S1 corresponds to a view of the lower arm 12 in the posture shown in FIG. 1 as viewed from the Y-axis positive direction shown in FIG. 1.

As shown in the enlarged view S1, the lower arm 12 includes a first extending portion 100, a second extending portion 200, and a connecting portion 300. The first extending portion 100 extends in a direction connecting the second axis A2 and the third axis A3, that is, a direction along the Z-axis. The second extending portion 200 faces the first extending portion 100 with a gap therebetween and extends in the same direction as the first extending portion 100, that is, in the direction along the Z axis. In other words, the second extending portion 200 is opposed to each other with a gap therebetween in the axial direction of the second axis A2 and the third axis A3. The first extending portion 100 has a first arm proximal end and a first arm distal end opposite to the first arm proximal end. The second extending portion 200 has a second arm proximal end and a second arm distal end opposite to the second arm proximal end. The first arm proximal end faces the second arm proximal end and the first arm distal end faces the second arm distal end.

The connecting portion 300 has a hollow structure and connects the first extending portion 100 and the second extending portion 200 between the second axis A2 and the third axis A3. Here, the connecting portion 300 having a hollow structure includes a reinforcing portion 312 in which a plurality of ribs connecting opposing inner walls of the connecting portion 300 having a hollow structure intersect with each other when viewed in the extending direction of the connecting portion 300, that is, the direction along the X-axis (see the side view of the robot 10 shown in FIG. 1). The detailed configuration of the reinforcing portion 312 will be described later with reference to FIGS. 3 and 4.

As described above, in the lower arm 12, the connecting portion 300 connecting the first extending portion 100 and the second extending portion 200 has a hollow structure. In addition, the connecting portion 300 includes a reinforcing portion 312 that connects opposing inner walls of the hollow portion of the connecting portion 300 when viewed in the direction along the X-axis.

Specifically, the reinforcing portion 312 includes a plurality of ribs that connect the opposing inner walls of the connecting portion 300 having a hollow structure when viewed in the direction along the X-axis, and the plurality of ribs intersect while being integrated with each other.

As described above, since the connecting portion 300 has a hollow structure and the reinforcing portion 312 is provided in the connecting portion 300, it is possible to reduce the weight of the lower arm 12 while ensuring the rigidity as a whole. In addition, when the lower arm 12 is used, it is possible to reduce the weight of the entire robot 10 while ensuring the rigidity.

Figure 2:
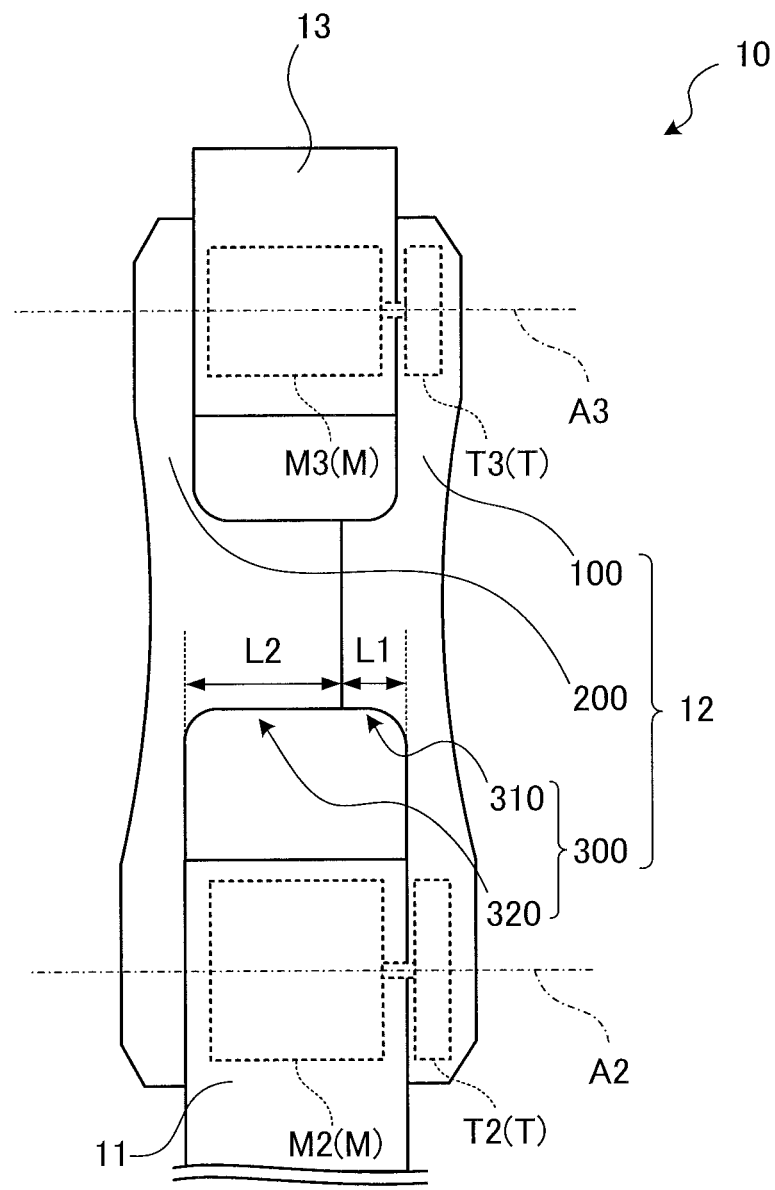
FIG. 2 is a rear view of the robot.

Next, the configuration of the robot 10 shown in FIG. 1 will be described in more detail with reference to FIG. 2. FIG. 2 is a rear view of the robot 10. As shown in FIG. 2, a distal end and a proximal end of the lower arm 12 each have a forked shape, the proximal end has a shape sandwiching the distal end of the pivot base 11, and the distal end has a shape sandwiching the proximal end of the upper arm 13.

Here, the driving portion M is built in the distal end of the pivot base 11. Since the driving portion M drives a shaft around the second axis A2, an axis number is added to a reference numeral and the driving portion M is described as the driving portion M2. The driving portions M for the other axes will be described in the same manner.

A power transmission mechanism T such as a reduction gear that transmits a driving force of the driving portion M2 is connected to the proximal end of the first extending portion 100 of the lower arm 12. Since the power transmission mechanism T transmits the driving force for driving the second axis A2, an axis number is added to a reference numeral and the power transmission mechanism T is described as the power transmission mechanism T2. The power transmission mechanisms T for the other axes will be described in the same manner.

A drive unit M3 is built in the proximal end of the upper arm 13. The distal end side of the first extending portion 100 of the lower arm 12 is connected to distal end of the first extending portion 100 of the lower arm 12.

As described above, the driving portion M and the power transmission mechanism T are coupled to the first extending portion 100. On the other hand, the driving portion M and the power transmission mechanism T are not coupled to the second extending portion 200. Therefore, in the robot 10 according to the present embodiment, the material of the first extending portion 100 of the lower arm 12 is a material having a larger longitudinal elastic modulus (Young's modulus) than the material of the second extending portion 200.

For example, the first extending portion 100 may be made of cast iron using cast iron such as spheroidal graphite cast iron. Further, the second extending portion 200 can be made by aluminum die casting using an aluminum alloy. As long as the modulus of longitudinal elasticity of the first extending portion 100 is greater than the modulus of longitudinal elasticity of the second extending portion 200, the combination of materials of the extending portions may be any combination of other materials.

As described above, by making the material of the first extending portion 100 in the lower arm 12 a material having a higher modulus of longitudinal elasticity than the material of the second extending portion 200, it is possible to ensure the rigidity of the first extending portion 100 to which the driving portion M and the power transmission mechanism T are coupled. In addition, since the first extending portion 100 is a portion mainly responsible for the rigidity of the lower arm 12 and the second extending portion 200 is a portion secondarily responsible for the rigidity with emphasis on being lighter than the rigidity, it is possible to reduce the weight of the lower arm 12 as a whole.

As shown in FIG. 2, the connecting portion 300 includes a first connecting portion 310 having a hollow structure integrated with the first extending portion 100 and a second connecting portion 320 having a hollow structure integrated with the second extending portion 200. That is, the first connecting portion 310 is integrally formed of the same material as the first extending portion 100, and the second connecting portion 320 is integrally formed of the same material as the second extending portion 200.

That is, the connecting portion 300 is a generic term for the first connecting portion 310 having a hollow structure integrated with the first extending portion 100 and the second connecting portion 320 having a hollow structure integrated with the second extending portion 200. The first connecting portion 310 and the second connecting portion 320 are coupled to each other such that the hollow portions communicate with each other. Note that the reinforcing portion 312 shown in FIG. 1 is provided in the first connecting portion 310. Details of the reinforcing portion 312 will be described later with reference to FIGS. 3 and 4.

Hereinafter, the first extending portion 100 and the first connecting portion 310 may be collectively referred to as the first extending portion 100, and the second extending portion 200 and the second connecting portion 320 may be collectively referred to as the second extending portion 200.

As described above, by providing the reinforcing portion 312 in the first connecting portion 310 integrated with the first extending portion 100, it is possible to increase the natural frequency with respect to the vibration mode such as bending in the X direction (primary vibration mode) or bending in the Y direction (secondary vibration mode) in the first extending portion 100 which is a portion mainly responsible for the rigidity of the lower arm 12. In addition, the rigidity of the first extending portion 100 can be ensured, and the rigidity of the lower arm 12 as a whole can be ensured.

Here, when the amount of protrusion of the first connecting portion 310 protruding from the first extending portion 100 is "L1" and the amount of protrusion of the second connecting portion 320 protruding from the second extending portion 200 is "L2", the magnitude relationship therebetween is "L2>L1".

In other words, the length along the extending direction (length along the X-axis) of the first connecting portion 310 is shorter than the length along the extending direction (length along the X-axis) of the second connecting portion 320. With this configuration, the volume of the first extending portion 100 can be reduced as compared with the case where the connecting portion 300 is equally divided in the extending direction. That is, it is possible to reduce the volume of the first extending portion 100 which has a larger modulus of longitudinal elasticity than the second connecting portion 320 and thus has a larger specific gravity in many cases. Therefore, the weight of the lower arm 12 as a whole can be reduced.

Figure 3:
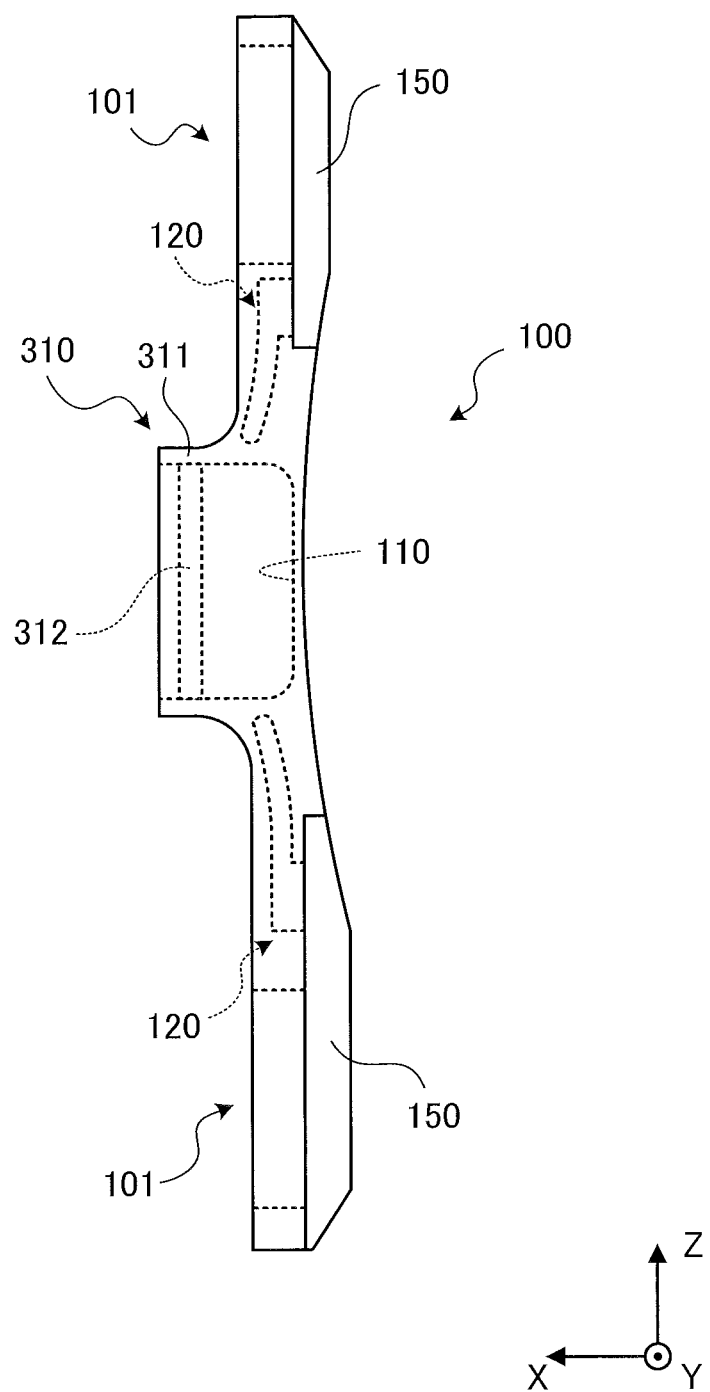
FIG. 3 is a side view of a first extending portion.
Figure 4:
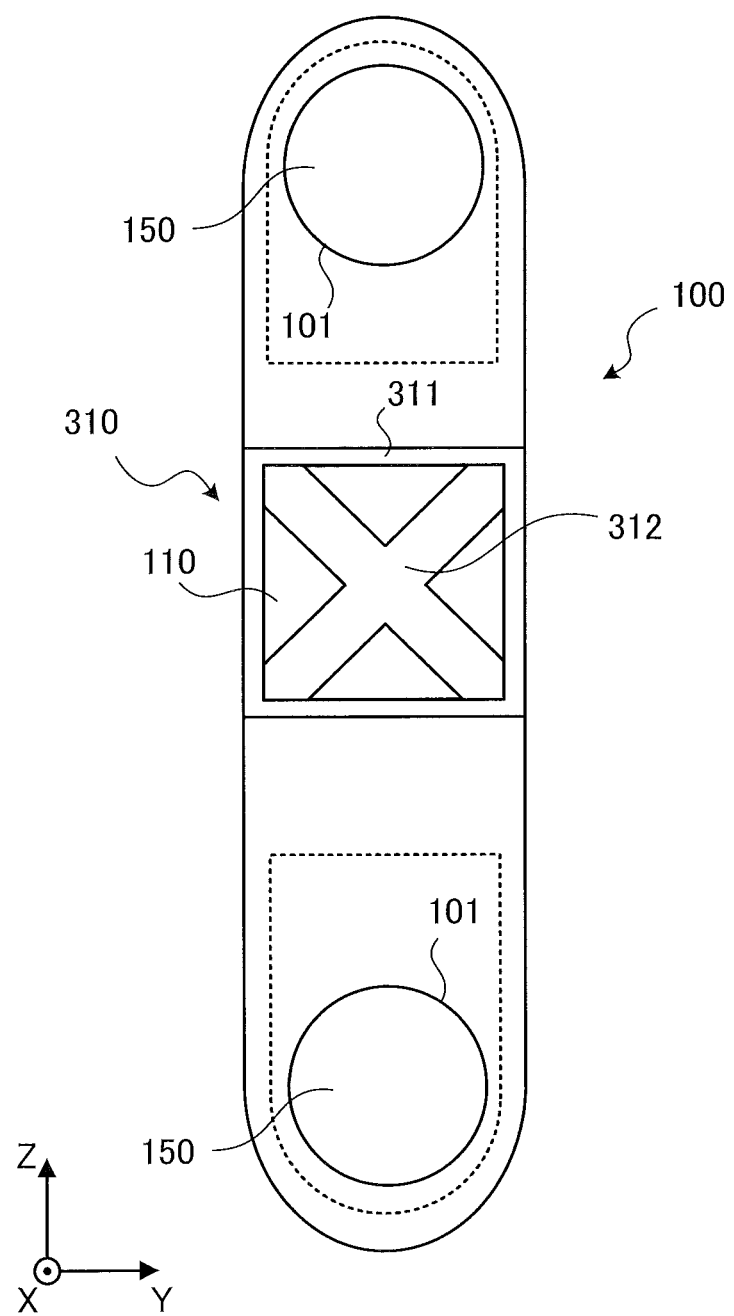
FIG. 4 is a front view of the first extending portion.

Next, the first extending portion 100 shown in FIG. 2 will be described in more detail with reference to FIGS. 3 and 4. FIG. 3 is a side view of the first extension portion 100, and FIG. 4 is a front view of the first extension portion 100. FIG. 3 corresponds to a view seen from the same direction as FIG. 2 (a view seen from the Y-axis positive direction), and FIG. 4 corresponds to a view seen from the surface side from which the first connecting portion 310 protrudes, that is, a view seen from the second extending portion 200 side shown in FIG. 2 (a view seen from the X-axis positive direction).

As shown in FIG. 3, the first extending portion 100 includes a hollow portion 120 that communicates with a surface (hereinafter, may be referred to as an "outer surface") opposite to a surface (hereinafter, may be referred to as an "inner surface") facing the second extending portion 200 shown in FIG. 2 at a distal end and a proximal end.

By providing the hollow portion 120 in the first in the first extending portion 100, it is possible to reduce the weight of the first extending portion 100. Each hollow portion 120 extends from the first connecting portion 310 having a hollow structure toward each end portion along the extending direction of the first extending portion 100 and communicates with the outer surface of the first extending portion 100. Although two hollow portions 120 are shown in FIG. 3, the number of hollow portion 120 may be one or three or more. The through hole 101 which passes through toward X-axis direction is provided on the distal end and the proximal end in the first extending portion 100. The through hole 101 is used for attaching the power transmission mechanism T (T2 and T3) shown in FIG. 2.

Here, the first extending portion 100 includes a cover 150 that covers outer surfaces of the distal end and the proximal end. Each cover 150 covers the through hole 101 and the communication port to each hollow portion 120. By covering the above-described communication port with the cover 150, it is possible to prevent dust, water, or the like from entering the inside of the first extending portion 100 and to form the surface of the arm into a smooth shape.

The material of the cover 150 may be the same as that of the first extending portion 100, but may be a lightweight member such as resin. By using the cover 150 made of a lightweight member, it is possible to reduce the weight of the entire first extending portion 100.

The rib may be formed on the surface of the first extending portion 100 covered with the cover 150 by providing, for example, a convex or concave shape extending in the extending direction of the first extending portion 100. In addition, the extending direction of the rib may be a direction different from the extending direction of the first extending portion 100, or a plurality of directions may be combined.

As described above, by forming the rib in the direction or the portion where the rigidity is desired to be maintained according to the specific shape of the first extending portion 100 and reducing the thickness of the other portion, it is possible to achieve the weight reduction while maintaining the rigidity of the first extending portion 100. In addition, by covering the unevenness of the surface with the cover 150, the outer shape of the first extending portion 100 can be formed into a gentle shape.

In addition, as shown in FIG. 3, the first connecting portion 310 having a hollow structure includes an outer wall 311 protruding from the inner surface of the first extending portion 100 to surround the hollow. Further, the bottom surface 110 of the hollow portion of the first connecting portion 310 is closer to the outer surface than the inner surface of the first extending portion 100 excluding the first connecting portion 310.

With this configuration, it is possible to reduce the thickness of the first extending portion 100 and to reduce the weight of the first extending portion 100. The position of the bottom surface 110 may be aligned with the position of the inner surface of the first extending portion 100, or may be a position protruding from the inner surface of the first extending portion 100.

Further, as shown in FIG. 3, the first connecting portion 310 includes a reinforcing portion 312 that protrudes from the inner wall of the outer wall 311 and connects the inner walls of the outer wall 311. Here, the reinforcing portion 312 is provided at a position closer to the second connecting portion 320 shown in FIG. 2 than the inner surface of the first extending portion 100.

As described above, by providing the reinforcing portion 312 at a position shifted to the front side (the X-axis positive direction side) from the extending portion extending in the extending direction (the direction along the Z-axis) of the first extending portion 100, it is possible to increase the natural frequency with respect to the vibration mode of bending (the primary vibration mode) in the X-direction in the first extending portion 100.

Here, the configuration of the reinforcing portion 312 will be described in more detail with reference to FIG. 4. As shown in FIG. 4, when the first extending portion 100 is viewed from the second extending portion 200 side shown in FIG. 2, the shape of the first connecting portion 310 is a hollow rectangular shape. Ribs connecting the diagonal lines of the rectangle protrude from the inner wall of the outer wall 311 continuous in a rectangular shape, and portions of the ribs intersecting each other are integrated with each other. From the viewpoint of suppressing interference with other arms, at least one of the corner portions of the outer wall 311 continuing in a rectangular shape may be formed in an R shape.

As shown in FIG. 4, the bottom surface 110 shown in FIG. 3 can be seen from between the ribs. That is, the reinforcing portion 312 has a cavity between the ribs that allows the hollow portion near the bottom surface 110 to communicate with the outside. As described above, by forming the reinforcing portion 312 in the shape of ribs intersecting with each other and forming a cavity between the ribs, it is possible to discharge a sand mold or the like used at the time of casting through the cavity. Therefore, the first connecting portion 310 and the first extending portion 100 have a shape that is easy to be integrally cast. In a state before the power transmission mechanism T (T2 and T3) shown in FIG. 2 is attached, the inner surface of the cover 150 shown in FIG. 3 can be seen from the through hole 101.

When viewed in the direction shown in FIG. 4, the reinforcing portion 312 may have a shape different from the shape shown in FIG. 4 as long as it has the above-described cavity. For example, the ribs connecting the midpoints of the opposing inner walls of the first connecting portion 310 having a hollow structure and rectangular shape may be combined with or used instead of the ribs connecting the diagonal lines. It should be noted that the arrangement and the number of the ribs described above are merely examples, and the arrangement and the number of the ribs are not limited.

Further, a plurality of reinforcing portions 312 may be provided at intervals with respect to the extending direction of the first connecting portion 310. When a plurality of reinforcing portions 312 are provided, each of reinforcing portions 312 may have different shapes.

Although FIG. 4 illustrates a case where the width of the first connecting portion 310 in the direction along the Y axis is the same as the width of the extending portion of the first extending portion 100, the width of the first connecting portion 310 may be smaller than the width of the first extending portion 100. Further, as shown by a broken line in FIG. 4, a rib for attaching the cover 150 is formed on the outer surface side of the first extending portion 100 so as to surround the through hole 101 and protrude toward the cover 150 along the outer shape of the first extending portion 100. Here, in the side view shown in FIG. 3, the case where the through hole 101 and the hollow portion 120 do not directly communicate with each other (indirectly communicate with each other via the space in the cover 150) is shown, but the through hole 101 and the hollow portion 120 may directly communicate with each other in the extending direction of the first extending portion 100.

Figure 5:
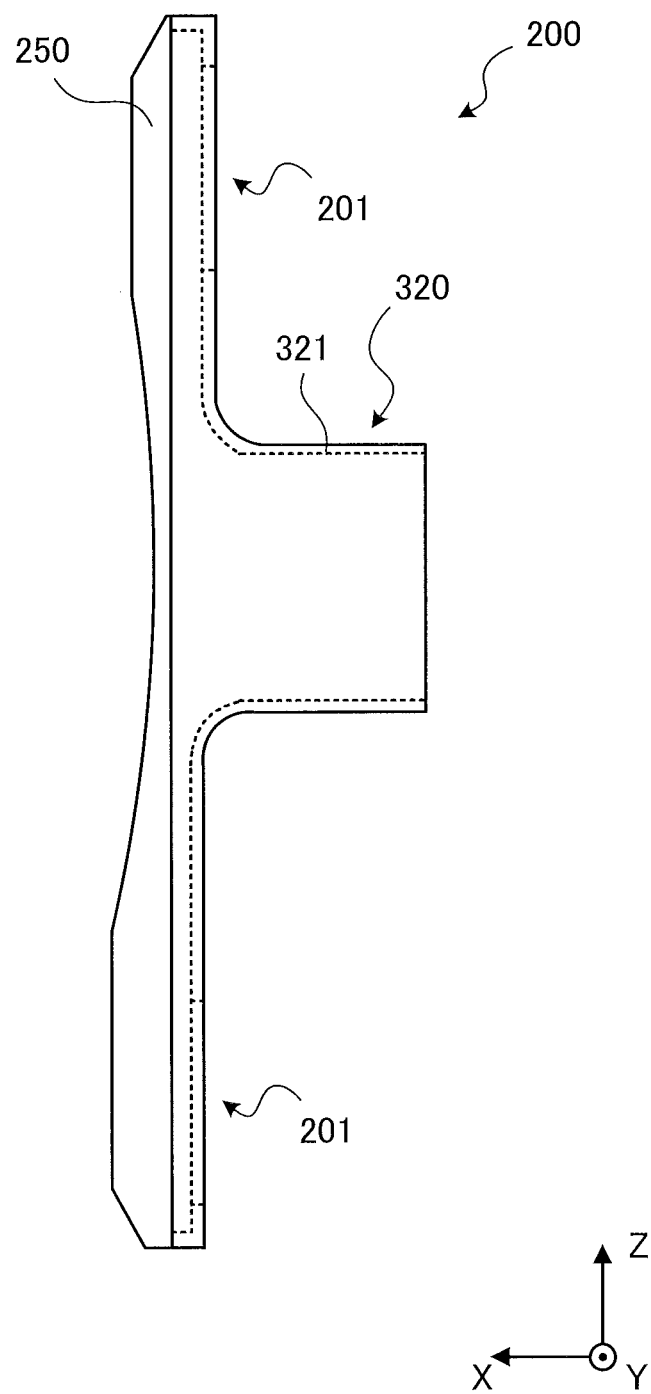
FIG. 5 is a side view of the second extending portion.
Figure 6:
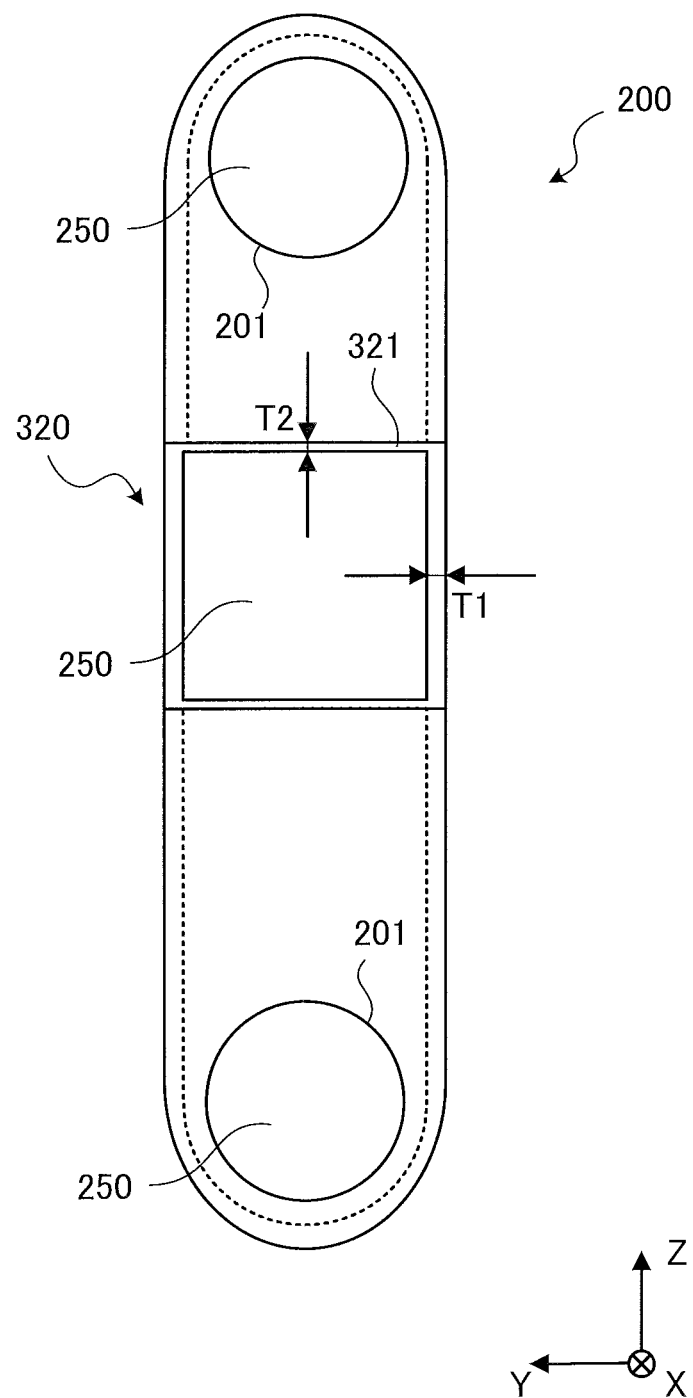
FIG. 6 is a front view of the second extending portion.

Next, the second extending portion 200 shown in FIG. 2 will be described in more detail with reference to FIGS. 5 and 6. FIG. 5 is a side view of the second extending portion 200 and FIG. 6 is a front view of the second extending portion 200. FIG. 5 corresponds to a view seen in the same direction as FIG. 2 (a view seen from the Y-axis positive direction), and FIG. 6 corresponds to a view seen from a surface from which the second connecting portion 320 protrudes, that is, the first extending portion 100 side shown in FIG. 2 (a view seen from the X-axis negative direction).

As shown in FIG. 5, the second extending portion 200 includes a cover 250 that covers a surface (hereinafter may be referred to as an "outer surface") opposite to a surface (hereinafter may be referred to as an "inner surface") facing the first extending portion 100 shown in FIG. 2. Although the cover 250 covering the entire outer surface of the second extending portion 200 is shown in FIG. 5, the cover 250 may cover at least a part of the outer surface, or a plurality of covers 250 covering the outer surface may be provided.

Here, the cover 250 has a shape that forms a space with the outer surface of the second extending portion 200. Therefore, a wire body such as a cable or a hose can be arranged in the space. That is, a wire body such as a cable can be routed inside the second extending portion 200.

The material of the cover 250 may be the same as that of the second extending portion 200, but may be a lightweight member such as resin. By using the cover 250 made of a lightweight member, it is possible to reduce the weight of the entire second extending portion 200.

In addition, as shown in FIG. 5, the second connecting portion 320 having hollow structure includes an outer wall 321 protruding from an inner surface of the second extending portion 200 to surround the hollow. The hollow portion of the second connecting portion 320 penetrates in the direction along the X-axis, and the outer surface side of the second extending portion 200 is covered with the cover 250.

Here, the space covered by the cover 250 in the extending portion of the second extending portion 200 and the hollow portion of the second connecting portion 320 communicate with each other. In addition, through holes 201 penetrating in a direction along the X-axis direction are provided on the distal end and the proximal end in the second extending portion 200. Therefore, by passing through the through hole 201, a wire body such as a cable passing through the pivot base 11 and the upper arm 13 shown in FIG. 2 can be arranged in a space inside the second extending portion 200.

Next, the shape of the second connecting portion 320 will be described. As shown in FIG. 6, when the second extending portion 200 is viewed from the first extending portion 100 side shown in FIG. 2, the shape of the second connecting portion 320 has a hollow structure and a rectangular shape. That is, the second extending portion 200 includes the outer wall 321 which is continuous in a rectangular shape. The inner surface of the cover 250 shown in FIG. 5 can be seen from the hollow portion of the second extending portion 200 and the through hole 201. As indicated by a broken line in FIG. 6, a rib for attaching the cover 250 is formed on the outer surface of the second extending portion 200 to protrude toward the cover 250 along the outer periphery of the second extending portion 200.

Here, as shown in FIG. 6, the thickness of the outer wall 321 is different between the side in the extending direction (the direction along the Z axis) of the second extending portion 200 and the side intersecting the extending direction. To be specific, when the thicknesses of the sides (an example of "a second outer wall") intersecting with the extending direction are defined as "T2" and the thicknesses of the sides (an example of "a first outer wall") along the extending direction are defined as "T1", the magnitude relationship therebetween is "T2<T1".

Thus, the thickness of the portion of the outer wall 321 that is less likely to affect the decrease in the natural frequency of the natural vibration mode of the lower arm 12 as a whole is smaller than the thickness of the portion of the outer wall 321 that is likely to affect the decrease in the natural frequency of the lower arm 12. Therefore, it is possible to reduce the weight of the second extending portion 200 while suppressing a decrease in the natural frequency with respect to the natural vibration mode.

Although FIG. 6 illustrates a case where the width of the second connecting portion 320 in the direction along the Y axis is the same as the width of the extending portion of the second extending portion 200, the width of the second connecting portion 320 may be smaller than the width of the second extending portion 200.

Figure 7:
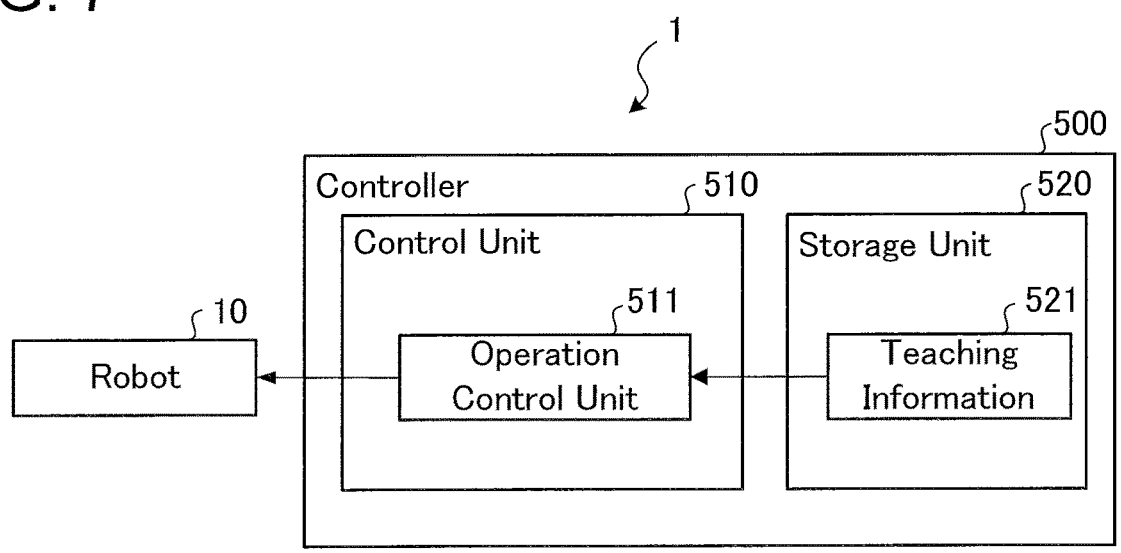
FIG. 7 is a block diagram illustrating a configuration of the robot system.

Next, a configuration of the robot system 1 will be described with reference to FIG. 7. FIG. 7 is a block diagram illustrating a configuration of the robot system 1. As shown in FIG. 7, the robot system 1 includes the robot 10 and a controller 500. Note that the robot 10 is connected to the controller 500.

First, since the robot 10 has already been described with reference to FIG. 1 and the like, the description thereof is omitted here. The controller 500 includes a control unit 510 and a storage unit 520. The control unit 510 includes an operation control unit 511. The storage unit 520 stores teaching information 521.

Here, the controller 500 includes, for example, a computer including a central processing unit (CPU), a read only memory (ROM), a random access memory (RAM), a hard disk drive (HDD), an input/output port, and the like, and various circuits.

The CPU of the computer functions as the operation control unit 511 of the control unit 510, for example, by reading and executing a program stored in the ROM. The operation control unit 511 may be configured by hardware such as an application specific integrated circuit (ASIC) or a field programmable gate array (FPGA).

The storage unit 520 corresponds to, for example, a RAM or an HDD. The RAM or the HDD can store the teaching information 521. Note that the controller 500 may acquire the above-described programs and various types of information via another computer or a portable recording medium connected via a wired or wireless network. Further, the controller 500 may be configured as a plurality of devices capable of communicating with each other, or may be configured as a hierarchical device capable of communicating with a higher-level or lower-level device.

The control unit 510 performs operation control of the robot 10. When a plurality of controllers 500 are provided, the control unit 510 also performs a process of synchronizing the controllers 500. The operation control unit 511 operates the robot 10 based on the teaching information 521.

The operation control unit 511 improves the operation accuracy of the robot 10 by performing feedback control while using an encoder value in an actuator (not illustrated) which is a power source of the robot 10.

The teaching information 521 is information that is created in a teaching stage in which an operation is taught to the robot 10 and includes a "job" that defines an operation path of the robot 10. Although one robot 10 and one controller 500 are shown in FIG. 7, a plurality of robots 10 and a plurality of controllers 500 may be provided.

As described above, the robot 10 according to an aspect of the embodiment includes the base 10b, the pivot base 11, the lower arm 12, and the upper arm 13. The base 10b is fixed to the installation surface IS. A proximal end of the pivot base 11 is supported on an upper surface of the base 10b, and the pivot base 11 turns around a first axis A1 along a vertical direction. A distal end and a proximal end of the lower arm 12 are both formed in a forked shape 501, the proximal end is supported to sandwich the distal end of the pivot base 11, and the lower arm 12 turns around a second axis A2 perpendicular to the first axis A1. A proximal end of the upper arm 13 is supported to be sandwiched by a distal end of the lower arm 12, and the upper arm 13 turns around a third axis A3 parallel to the second axis A2.

The lower arm 12 includes a first extending portion 100, a second extending portion 200, and a connecting portion 300 having hollow structure. The first extending portion 100 extends in a direction connecting the second axis A2 and the third axis A3. The second extending portion 200 faces the first extending portion 100 with a gap therebetween and extends in the same direction as the first extending portion 100. The connecting portion 300 having hollow structure connects the first extending portion 100 and the second extending portion 200 between the second axis A2 and the third axis A3. The connecting portion 300 includes a reinforcing portion 312 in which a plurality of ribs that connect opposing inner walls of the connecting portion 300 to intersect with each other when viewed in the extending direction of the connecting portion 300.

As described above, in the lower arm 12 of the robot 10, the connecting portion 300 that connects the first extending portion 100 and the second extending portion 200 has a hollow structure, and the reinforcing portion 312 in which the plurality of ribs that couple the opposing inner walls of the connecting portion 300 intersect with each other is provided. Therefore, it is possible to reduce the weight of the lower arm 12 while securing the rigidity thereof. Therefore, it is possible to reduce the weight of the robot 10 including the lower arm 12 while ensuring the rigidity thereof.

In the embodiment described above, the so-called six-axis robot 10 is shown, but the number of axes of the robot may be five axes or less or seven axes or more. In the embodiment described above, the lower arm 12 which is the second arm of the robot 10 includes the first extending portion 100, the second extending portion 200, and the connecting portion 300 having hollow structure. However, such a configuration may be applied to other arms.

Further effects and modifications can be easily derived by those skilled in the art. For this reason, the broader aspects of the invention are not limited to the specific details and representative examples shown and described above. Accordingly, various modifications may be made without departing from the spirit or scope of the general inventive concept as defined by the appended claims and their equivalents.

The term "comprise" and its variations are intended to mean open-ended terms, not excluding any other elements and/or components that are not recited herein. The same applies to the terms "include", "have", and their variations.

The component suffixed with a term such as "member", "portion", "part", "element", "body", and "structure" is intended to mean that there is a single such component or a plurality of such components.

Ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

Approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

The phrase "at least one of A and B" is intended to be interpreted as "only A", "only B", or "both A and B".

Obviously, numerous modifications and variations of the present disclosure are possible in light of the above teachings. It is therefore to be understood that within the scope of the appended claims, the present disclosure may be practiced otherwise than as specifically described herein.

What is claimed is:

1. A robot comprising:
   a base fixed to an installation surface;
   a pivot base having a pivot base proximal end and a pivot base distal end opposite to the pivot base proximal end which is connected to the base such that the pivot base is rotatable around a first axis along a vertical direction;
   an upper arm; and
   a lower arm comprising:
      a first extending portion having a first arm proximal end and a first arm distal end opposite to the first arm proximal end, a second axis perpendicular to the first axis passing through the first arm proximal end, a third axis parallel to the second axis passing through the first arm distal end, the first extending portion including a first connecting portion which protrudes along the second axis between the first arm proximal end and the first arm distal end and which has an outer wall to form a hollow structure;
      a second extending portion having a second arm proximal end and a second arm distal end opposite to the second arm proximal end, the second axis passing through the second arm proximal end, the third axis passing through the second arm distal end, the second extending portion including a second connecting portion which protrudes along the second axis between the second arm proximal end and the second arm distal end and which has a hollow structure;
      the first connecting portion and the second connecting portion being connected to form a connecting portion such that the first arm proximal end faces the second arm proximal end and such that the first arm distal end faces the second arm distal end;
      a reinforcing portion provided in the first connecting portion, not in the second connecting portion, to connect one portion on an inner surface of the outer wall and another portion on the inner surface of the outer wall facing toward the one portion;
      the pivot base distal end being provided between the first arm proximal end and the second arm proximal end to be connected to the first arm proximal end and the second arm proximal end such that the lower arm is rotatable around the second axis; and
      the upper arm being provided between the first arm distal end and the second arm distal end to be connected to the first arm distal end and the second arm distal end such that the upper arm is rotatable around the third axis.

2. The robot according to claim 1,
   wherein the first extending portion is connected to a driving portion and a power transmission mechanism, and
   wherein the first extending portion is made of a material having a modulus of longitudinal elasticity greater than a modulus of longitudinal elasticity of a material of the second extending portion.

3. The robot according to claim 2,
   wherein the first connecting portion is integrated with the first extending portion, and the second connecting portion is integrated with the second extending portion.

4. The robot according to claim 3, wherein a length of the first connecting portion along an extending direction parallel to the second axis is shorter than a length of the second connecting portion along the extending direction.

5. The robot according to claim 3, wherein the reinforcing portion is provided at a position closer to the second connecting portion than a surface of the first extending portion facing the second extending portion.

6. The robot according to claim 3, wherein the second connecting portion has a first outer wall and a second outer wall whose thickness is smaller than a thickness of the first outer wall, the first outer wall being along a connecting direction connecting the second axis and the third axis, the second wall crossing the connecting direction.

7. The robot according to claim 3, wherein the first extending portion includes a hollow portion communicating with a surface opposite to a surface facing the second extending portion at a position other than the first connecting portion.

8. The robot according to claim 3,
   wherein the second extending portion includes a cover covering at least a part of an opposite surface opposite to a surface facing the first extending portion, and
   wherein the cover defines a space between the cover and the opposite surface.

9. The robot according to claim 1, wherein the reinforcing portion has one rib and another rib which intersect each other, the one rib connecting a first portion on the inner surface of the outer wall and a second portion on the inner surface of the outer wall facing toward the first portion, the another rib connecting the one portion on the inner surface of the outer wall and the another portion on the inner surface of the outer wall.

* * * * *